(12) United States Patent
Erpeldinger

(10) Patent No.: US 6,557,169 B1
(45) Date of Patent: Apr. 29, 2003

(54) METHOD AND SYSTEM FOR CHANGING THE OPERATING SYSTEM OF A WORKSTATION CONNECTED TO A DATA TRANSMISSION NETWORK

(75) Inventor: Bernard Erpeldinger, St. Jeannet (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/273,667

(22) Filed: Mar. 23, 1999

(30) Foreign Application Priority Data

Oct. 11, 1998 (EP) .............................. 98480076

(51) Int. Cl.⁷ ............................. G06F 9/44; G06F 9/445
(52) U.S. Cl. ....................................... 717/173; 717/178
(58) Field of Search ..................... 717/11, 3, 168–178; 709/200–201, 216–217, 219–223, 319; 713/1–2, 100

(56) References Cited

U.S. PATENT DOCUMENTS

| | | | |
|---|---|---|---|
| 5,230,052 A | * 7/1993 | Dayan et al. ................... 713/2 |
| 5,469,573 A | * 11/1995 | McGill, III et al. ........ 717/127 |
| 5,964,874 A | * 10/1999 | Gross et al. ................. 713/100 |
| 5,968,170 A | * 10/1999 | Gross et al. .................... 713/1 |
| 5,968,174 A | * 10/1999 | Hughes ......................... 713/2 |
| 5,991,860 A | * 11/1999 | Gross et al. ................. 711/173 |
| 6,119,212 A | * 9/2000 | Gross et al. ................. 711/173 |
| 6,128,734 A | * 10/2000 | Gross et al. ................. 713/100 |
| 6,138,179 A | * 10/2000 | Chrabaszcz et al. .......... 710/10 |

* cited by examiner

Primary Examiner—Gregory Morse
Assistant Examiner—Hoang-Vu Antony Nguyen-Ba
(74) Attorney, Agent, or Firm—Carlos Munoz-Bustamante

(57) ABSTRACT

A method and system of changing a current operating system to a new operating system in a workstation connected to a data transmission network interconnecting a plurality of workstations each having a storage device and a plurality of servers providing services to the workstations through the network, at least one of the plurality of servers being a software distribution server providing one of the plurality of workstations with updated application code. Such a method comprises the steps of creating in the storage device of the workstation a first partition containing a minimum version of the current operating system and a second partition including a free storage space sufficient to store the partition image of the new operating system, transferring the partition image of the new operating system from the software distribution server to the second partition, deleting the current operating system from the storage device of the workstation and delimiting a new partition for storing the new operating system, and loading the new operating system resulting from the partition image stored in the second partition.

15 Claims, 2 Drawing Sheets

METHOD AND SYSTEM FOR CHANGING THE OPERATING SYSTEM OF A WORKSTATION CONNECTED TO A DATA TRANSMISSION NETWORK

BACKGROUND OF THE INVENTION

The present invention relates to using software distribution server(s) on a data transmission network for updating application software of a workstation connected to the network, and relates in particular to a method and system for changing the operating system of a workstation connected to a data transmission network.

DESCRIPTION OF THE RELATE ART

Data transmission networks include Local Area Networks (LAN), generally limited to a site owned by an enterprise and achieving high speeds, or Wide Area Networks (WAN) which connect together several LANs using connections of telecommunication firms.

In a data transmission network, such as a LAN or a WAN, a need to share information between users (which can be customers, business partners, providers etc.) leads to the use of servers. A server is a computer which provides services to several users at the same time. Such services can be data services (price lists, employee records, . . . ) application services (e.g. ordering, payroll, . . . ) or other services such as printing, electronic mail or software distribution. Depending on the implementation, a server may provide several services or types of services. Of course, several users can connect to one server and use the same service and a user may connect to several servers to use different services.

A user is associated with a workstation physically connected to the data transmission network. Such a workstation is provided with files which are stored on direct access storage disks which can be split into disk partitions. This allows management of different kinds of files. Thus, the workstation disks can include separate partitions for the operating system files, the application software and the application data. Updating application software stored in a workstation can be made in several ways, such as by using distribution media such as diskettes or CD-ROM's, or by using distribution files stored on a standard server, or from a software distribution server. The distribution of the application code by a software distribution server has several advantages and therefore is more and more used in the business environment. These advantages are: It enables saving time spent by the users for new installations and therefore can easily be planned during periods of time when the workstation is not used; it ensures that a given community of users have the same version of applications; and it helps to control who is using a given application at a given time.

Distribution of application software from a software distribution server requires that a software distribution application is running in the workstation. This software distribution application needs to use functions of the operating system managing the workstation. Such functions are hardware management allowing various applications to share the same hardware, application management, functions starting the application, printing, networks access.

Like the business applications, the operating system managing the workstation needs to be updated or changed. Unfortunately, inasmuch as the software distribution application is using some functions of the operating system, major changes thereof like upgrading to a new version usually cannot be made by such a software distribution mechanism without human intervention on the workstation. Thus, the prior art systems have undesirable limitation and disadvantage.

SUMMARY OF THE INVENTION

The present invention overcomes the limitations and disadvantages of the prior art.

An advantage of the present invention is to achieve a method and system for changing the operating system of a workstation in a data transmission network without any on-site intervention.

The present invention relates therefore to a method and system of changing a current operating system to a new operating system at a workstation in a data transmission network interconnecting a plurality of workstations having each a storage device and a plurality of servers providing services to the workstations through the network, at least one of the plurality of servers being a software distribution server providing one of the plurality of workstations with updated application software. This invention discloses the steps of: a) creating (in Phase 0) in the storage device of the workstation a maintenance partition containing a minimum version of the current operating system and a backup partition including free storage space sufficient to store the partition image of the new operating system; b) transferring (in Phase 1) the partition image of the new operating system form the software distribution server to the backup partition; c) deleting (in Phase 2) the current operating system from the storage device of the workstation and delimiting a new partition for storing the new operating system; and d) loading (in Phase 3) the new operating system resulting from the partition image stored in the backup partition.

Additional objects and advantages of the present invention will be apparent to those skilled in the relevant arts.

BRIEF DESCRIPTION OF THE DRAWINGS

The objects, characteristics and advantages of the present invention will become apparent from the following description given in reference to the accompanying drawings wherein.

DETAILED DESCRIPTION OF THE INVENTION

Figure 1:
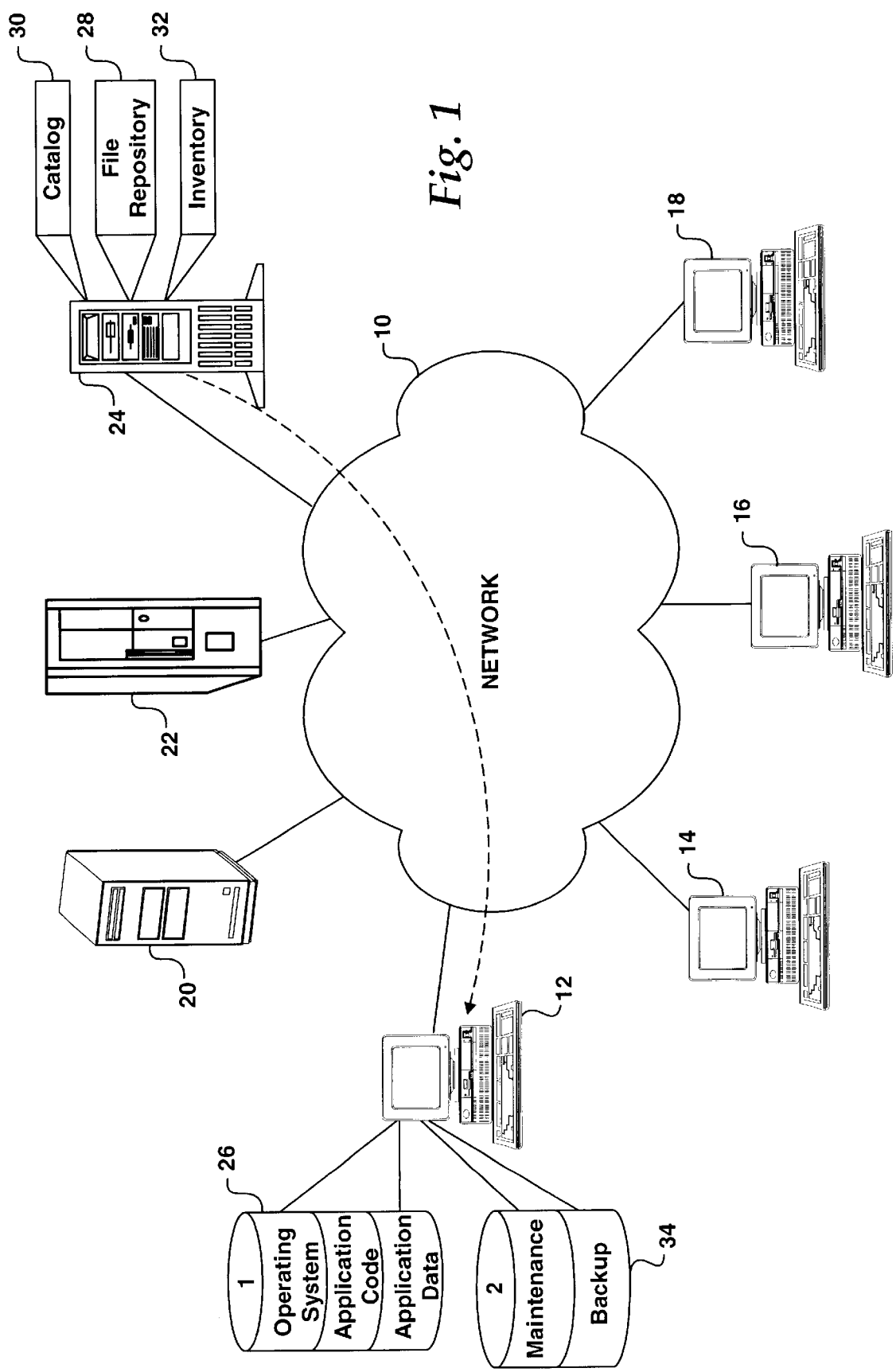
FIG. 1 is a block-diagram representing schematically a data transmission network connecting a plurality of workstations and a software distribution server used to transfer a new operating system to one of these workstations by using the method according to the present invention.

As illustrated in FIG. 1, a data transmission network 10 which can be a LAN or a WAN, includes a plurality of workstations 12, 14, 16, 18 which are connected thereto and which share the services provided by several servers 20,22, 24. Among these servers, server 24 is a software distribution server used to transfer application software to the workstation, and in particular, a new operating system to replace the current operating system of workstation 12 by using the method according to the present invention.

Files stored in workstation 12 are divided into three parts which are stored in three partitions(or parts) of the direct access disk 26 associated with the workstation. A first part is application data which can be entered by the user or which comes from a server. A second part is application software (also sometimes referred to as application code) which can be updated either by the user (with a diskette) or by a transfer from software distribution server 24 as mentioned above. A third part is an operating system which can be updated without on-site intervention by using the method according to the present invention.

The updates of the operating system in software distribution server 24 are made of files grouped into change files including each several files. All the changed files are stored in file repository 28 and are identified in a catalog 30. The list and status of change files for each workstation are stored in an inventory database 32.

Figure 2:
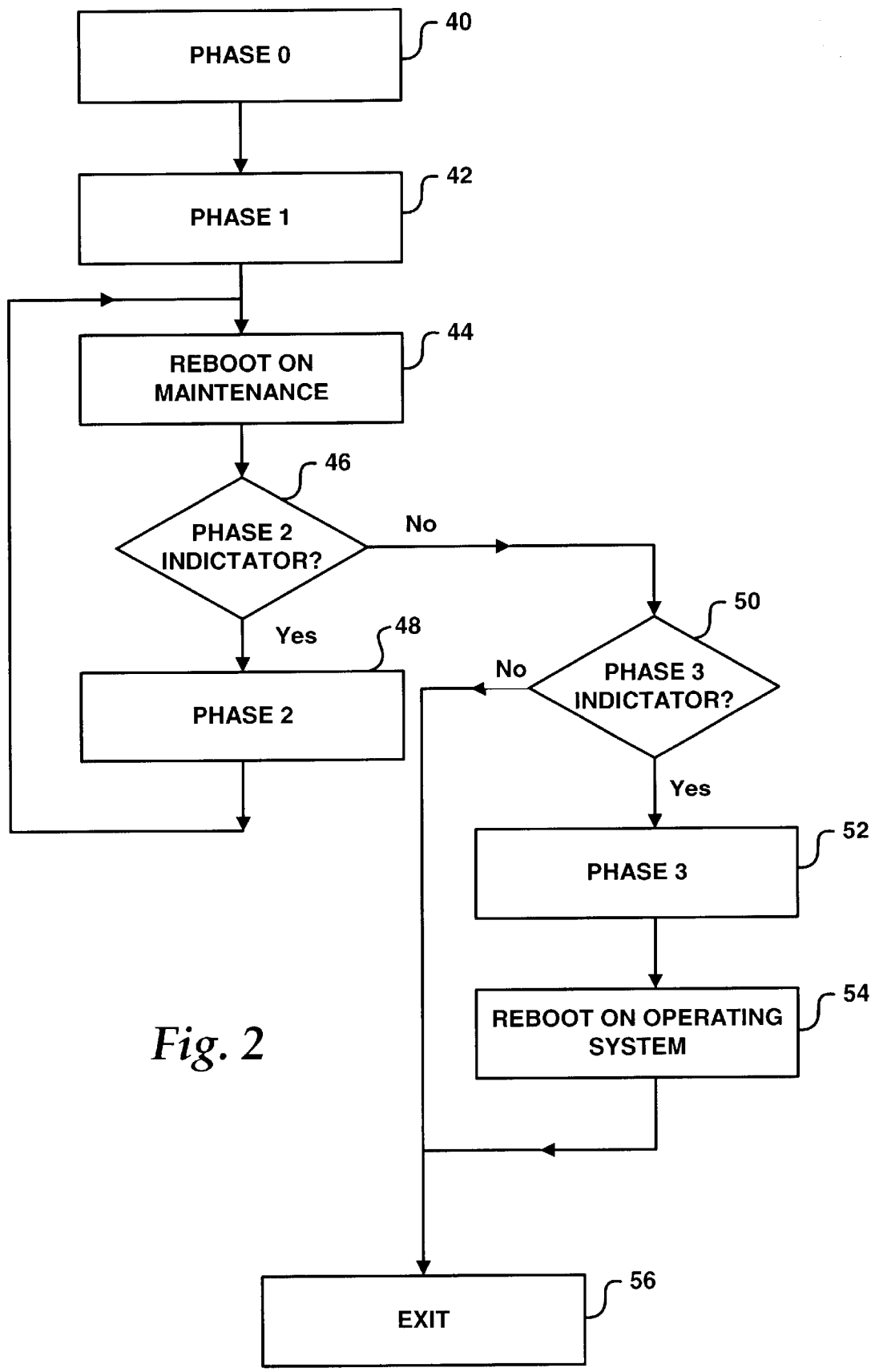
FIG. 2 is a flowchart of a method for changing the operating system of a workstation according to the present invention.

The method according to the present invention includes a number of operations which are illustrated in FIG. 2, and can be divided into the following phases. It is noted that all these operations can be started from the software distribution server in the preferred embodiment, although other modes of operation are also possible. Each one can be started at the most convenient time, specially the data transfer operation causing an important network load which should be executed during off-peak hours.

Phase 0 (40)

Two partitions are added in the storage of workstation 12: a maintenance partition and a backup partition. It is preferable that these two added partitions are in a second disk 34 different from the first disk 26 wherein are stored the application data, the application software and the operating system. However, the method could be implemented with the added partitions within a simple disk 26.

The maintenance partition is stored with a minimum version of the current operating system installed in the workstation, that is a version able to perform a subset of the workstation operations. Such operations are:

Execution of a STARTUP program. This is a program, which is first executed when the operating system starts. It is used to execute system commands (which can be used to start programs . . . )

Execution of system commands like: File creation, File copy, File delete, Partition definition, Partition format, . . .

Execution of utility programs like: Decompress images.

The backup partition includes sufficient free storage space to hold the partition image of the new operating system to be stored, that is a single file resulting from the compression (by a utility program) of all the files forming the operating system together with the structure of the directories thereof. Note that the free space on the backup partition is obtained using operating system functions, and the space requirements for the following actions are dependent on the size of the new version of the operating system code to be installed, so it is one of the parameters of the software distribution command which is initiated from the software distribution server.

It must be noted that all customization information should be setup correctly to save it in the backup partition. Such information includes:

Name of the user

Network address

Security information (Passwords)

Configuration data

Application data specific to this workstation

Phase 1 (42)

This phase consists mainly in transferring the partition image from the software distribution server disk to the workstation disk. This partition image is stored in the free space of the backup partition. During this phase, some files used during the next operations are also transferred to the backup partition.

Again, the user customization information is saved into the backup partition of the workstation. This operation which is the same as in Phase 0, is made to make sure that if some information has been updated since the beginning of Phase 1, the updates will be saved.

A file is created in the backup partition to indicate the next phase to be made (Phase 2 indicator). Then, a reboot of the workstation on the maintenance partition is triggered (44).

Phase 2 (48)

Before executing this phase, the STARTUP command checks whether there is a phase 2 indicator (46). If so, it gives the control to a command which executes Phase 2 (48), that is: it deletes the partition on disk 1 containing the current operating system; it recreates new partitions on disk 1. This operation enables the partition sizes to be changed.

Then, a file (Phase 3 indicator) is created in the backup partition to indicate the next operation to be made and a reboot of the workstation on the maintenance partition is triggered. At the same time, the Phase 2 indicator is deleted.

Phase 3 (52)

Before executing this phase, the STARTUP command checks whether there is an indicator in the backup partition. At this stage of the process this indicator cannot be a Phase 2 indicator (46), but only a Phase 3 indicator (50). If so, the STARTUP commands give the control to a command which executes the Phase 3 (52), that is: formats the partition for the operating system on disk 1, it loads the partition on disk 1 by using the partition image stored in the backup partition of disk 2 during Phase 1 and it restores the customization of the new operating system using the data which has been saved on the backup partition during Phase 1.

Then, a reboot of the workstation on the operating system partition on disk 1 is triggered (54). At the same time, the Phase 3 indicator is deleted.

It must be noted that, if any one of the operations of the process fails, in particular when the STARTUP command finds neither the Phase 2 indicator nor the Phase 3 indicator, the process exits (56) and an intervention is needed. Because the maintenance partition has only a minimum subset of the operating system function in its preferred embodiment, it does not provide network access. Therefore, intervention requires someone on site.

Although the present invention which has been described above relates to the updating or change of the operating system, it can be directed to the replacement or change of application software and/or application data, particularly when the size of the partitions on disk 1 have to be modified. In such a case, several partition images relative to the operating system and also to the application code or the application data are stored in the free space of the backup partition during Phase 1. Then, the partitions on disk 1 containing the operating system, the application code and the application data are deleted and new partitions are created on disk 1 during Phase 2. At last, the partition images which had been stored in the backup partition of disk 2 are loaded in the new partitions of disk 1 during Phase 3.

In conclusion, the method according to the present invention which is described above in reference to FIGS. 1 and 2 presents many advantages. In particular, it reduces the installation time since the change of the operating system is made automatically: it saves manpower cost since there is no need to dispatch on-site people; and it enables scheduling installation at the most convenient time (off-peak periods during nights or weekend) when the operation of the workstation can be interrupted or when human intervention (the alternatives) would be expensive.

Various modifications and adaptations to the embodiment disclosed herein will be apparent to those skilled in the relevant art. In addition, some of the features of the present invention can be used without the corresponding use of other features. The invention is suited for implementation in computer software as well as in other ways, so a program stored on computer readable media is one way to implement the present invention.

The invention has been described with reference to a series of steps and phases. The division of the phases and the order in which the steps are undertaken may be subject to some modification. Accordingly the foregoing description should be considered as merely illustrative of the principles of the present invention and not in limitation thereof.

What is claimed is:

1. A method of changing a current operating system to a new operating system in a workstation using a data transmission network interconnecting a plurality of workstations, each workstation having a storage device with at least one server being a software distribution server for providing one of said plurality of workstations with updated application software, said method comprising the steps of:
   a) creating in the storage device of said workstation a maintenance partition containing a version of said current operating system and a backup partition including sufficient free storage space to store the new operating system;
   b) storing customization information into said backup partition;
   c) transferring a partition image of said new operating system from said software distribution server to said backup partition on said workstation;
   d) deleting said current operating system from the storage device of said workstation and delimiting a new partition for storing said new operating system; and
   e) loading said new operating system resulting from said partition image stored in said backup partition.

2. The method as set forth in claim 1 wherein the customization information saved in the storing step (step b) includes at least of one following: the name of the user of the workstation, network address of the workstation, security information, configuration data and application data specific to the workstation.

3. The method as set forth in claim 1 wherein the transferring step (step c) for transferring the partition image to the backup partition further comprises the step of storing into the backup partition a second copy of the customization information.

4. The method as set forth in claim 3 wherein the second copy of customization information saved includes at least one of the following: the name of the user of the workstation, network address of the workstation, security information, configuration data or application data specific to the workstation.

5. The method as set forth in claim 3 wherein the loading step (step e) further comprises the steps of:
   e1) loading the copy of the new operating system from the backup partition to the delimited operating system partition;
   e2) restoring the customization information containing at least one of the following: the name of the user of the workstation, network address of the workstation, security information, configuration data or application data specific of the new operating system using the customization information which have been saved on the backup partition during the steps of transferring the partition image; and
   e3) rebooting the workstation whereby the new operating system is executed.

6. A method of changing a current operating system to a new operating system in a workstation having a storage device using a data transmission network to interconnect said workstation with a software distribution server for providing said workstation with updated application software, the method comprising the steps of:
   a) creating a maintenance partition containing a version of the current operating system and a backup partition including sufficient free storage space to store the new operating system in the storage device of said workstation;
   b) storing into said backup partition customization information; containing the name of the user of said workstation, network address of said workstation, security information, configuration data and application data specific to said workstation;
   c) transferring a partition image of the new operating system from the software distribution server to said backup partition on said workstation;
   d) deleting the current operating system from the storage device of said workstation and delimiting a new partition on the storage device for storing the new operating system;
   e) loading the new operating system resulting from said partition image stored in said backup partition on said workstation.

7. The method as set forth in claim 6, wherein said step of transferring the partition image to the backup partition further comprises the step of storing into said backup partition a second copy of said customization information containing the name of the user of said workstation, network address of said workstation, security information, configuration data and application data specific to said workstation whereby any customization information that was updated in the transferring step (step c) is saved.

8. The method as set forth in claim 7 wherein said step of loading the new operating system further includes the step of: restoring the customization information containing the name of the user of said workstation, network address of said workstation, security information, configuration data and application data specific of said new operating system using the data which have been saved on said backup partition during said step of transferring the partition image.

9. The method as set forth in claim 6 wherein the version of the operating system stored in the maintenance partition during the creating step (step a) is a minimum version of the current operating system.

10. The method as set forth in claim 9 wherein the minimum version of the current operating system includes at least the following operations:
    executing a startup program;
    execution of system file operations including at least the following functions: file creation, file copy, file delete, partition definition, partition format; and
    execution of utility programs.

11. The method as set forth in claim 6 wherein the maintenance partition and the backup partition of the creating step (step a) are created on a second storage device.

12. A method of changing a current operating system to a new operating system in a workstation having a first and second storage device using a data transmission network to interconnect to a server being a software distribution server for providing the workstation with updated application software, the method comprising the steps of:

a) executing a software distribution application in the workstation;

b) establishing a network session with the software distribution server;

c) creating in the first storage device of the workstation a maintenance partition containing a minimum version of the current operating system and a backup partition including sufficient free storage space to store the new operating system and customization information;

d) storing a first set of customization information into the backup partition;

e) transferring a partition image of the new operating system from the software distribution server to the backup partition on the workstation;

f) storing a second set of customization information into the backup partition whereby any updates to the customization information in the transferring step (step e) is saved;

g) deleting the current operating system from the second storage device of the workstation and delimiting a new partition on the second storage device for storing the new operating system;

h) transferring the new operating system image from the partition image stored in the backup partition on the workstation into the newly delimited partition on the second storage device;

i) restoring the customization information; and j) rebooting the system whereby the new operating system is executed.

13. The method as set forth in claim 12 wherein customization information saved in the storing step (step d) includes at least of one following: the name of the user of the workstation, network address of the workstation, security information, configuration data and application data specific to the workstation.

14. The method as set forth in claim 13 wherein the customization information restored in the restoring step (step i) includes at least of one following: the name of the user of the workstation, network address of the workstation, security information, configuration data and application data specific of the new operating system.

15. The method as set forth in claim 12 wherein the minimum version of the current operating system in the creating step (step c) includes at least the following operations:

executing a startup program;

execution of system file operations including at least the following functions: file creation, file copy, file delete, partition definition, partition format; and execution of utility programs.

* * * * *